(12) United States Patent
Kusmec-Aguilar et al.

(10) Patent No.: US 12,094,357 B2
(45) Date of Patent: Sep. 17, 2024

(54) SIMULATING COGNITIVE IMPAIRMENT

(71) Applicant: Innocorp, Ltd., Verona, WI (US)

(72) Inventors: Debra C. Kusmec-Aguilar, Verona, WI (US); Timothy Jorgensen, Verona, WI (US)

(73) Assignee: INNOCORP, LTD., Verona, WI (US)

( * ) Notice: Subject to any disclaimer, the term of this patent is extended or adjusted under 35 U.S.C. 154(b) by 334 days.

(21) Appl. No.: 17/362,935

(22) Filed: Jun. 29, 2021

(65) Prior Publication Data

US 2021/0327301 A1     Oct. 21, 2021

Related U.S. Application Data

(60) Continuation-in-part of application No. 16/421,052, filed on May 23, 2019, now Pat. No. 11,475,794, which is a division of application No. 15/008,117, filed on Jan. 27, 2016, now Pat. No. 10,366,630.

(60) Provisional application No. 62/108,804, filed on Jan. 28, 2015.

(51) Int. Cl.
    *G09B 23/28*      (2006.01)

(52) U.S. Cl.
    CPC .................. *G09B 23/28* (2013.01)

(58) Field of Classification Search
    CPC . G09B 23/28; G09B 9/00; G02B 5/22; G02B 5/20; G02B 7/006
    USPC ........................ 359/885, 891, 892
    See application file for complete search history.

(56) References Cited

U.S. PATENT DOCUMENTS

| | | | |
|---|---|---|---|
| 4,079,411 A | 3/1978 | Engelbrecht | |
| 6,145,983 A | 11/2000 | Schiffer | |
| 6,206,521 B1 * | 3/2001 | Kindschuh | G09B 19/00 |
| | | | 434/258 |
| 8,568,256 B1 * | 10/2013 | Richardson | A63B 43/04 |
| | | | 473/451 |

(Continued)

FOREIGN PATENT DOCUMENTS

| | | | | |
|---|---|---|---|---|
| CN | 103843362 A | | 6/2014 | |
| CN | 103941422 A | | 7/2014 | |
| GB | 2364277 A | * | 1/2002 | ............. B43K 29/10 |

OTHER PUBLICATIONS

"Demonstration: Fatal Vision Marijuana Simulation Experience Maze Activity", <<https://www.youtube.com/watch?v=yzfrC1oMcOU>>, May 17, 2016 (Year: 2016).*

(Continued)

*Primary Examiner* — Stephone B Allen
*Assistant Examiner* — Jyotsna V Dabbi
(74) *Attorney, Agent, or Firm* — Quarles & Brady LLP; Yakov Sidorin (57) ABSTRACT

Methods for simulating effects of impairment caused by recreational consumption of marijuana and/or alcohol using a system including optical filters and various radiant objects. The system includes i) an optical filter having a pre-defined spectral pass-band and a non-diffractive spatial pattern configured to deviate a beam of light incident onto the filter, and, optionally, ii) radiant objects at least one of which delivers light in a spectral band corresponding to color that is complementary to the color defined by the pass-band of the optical filter. Method for demonstration and analysis of impairment of cognitive function caused by using the system to affect the vision of the user.

14 Claims, 8 Drawing Sheets

(56) References Cited

U.S. PATENT DOCUMENTS

2013/0040767 A1* 2/2013 Gill ........................ A63B 59/50
473/570

OTHER PUBLICATIONS

Koehler, L. New Goggles Address Effects of Marijuana Use on Drivers [online] Jan. 27, 2015 [retrieved on Mar. 17, 2016], 4 pages. Retrieved from the Internet URL:http://fatalvision.com/news-events/2015/new-goggles-address-effects-of-marijuana-use-on-drivers/.
International Search Report and Written Opinion from PCT/US2016/15152, dated Apr. 1, 2016, 10 pages.

* cited by examiner

SIMULATING COGNITIVE IMPAIRMENT

CROSS-REFERENCE TO RELATED APPLICATIONS

This application is a continuation-in-part from the U.S. patent application Ser. No. 16/421,052, filed on May 23, 2019 and now published as US 2019/0287420, which is a divisional from the U.S. patent application Ser. No. 15/008,117, filed Jan. 27, 2016 and now granted as, U.S. Pat. No. 10,366,630, which in turn claims benefit of and priority from the U.S. Provisional Application No. 62/108,804, filed Jan. 28, 2015. The disclosures of each of the above-identified patent applications are incorporated herein by reference in its entirety.

TECHNICAL FIELD

The present invention relates to a system and method configured to simulate the effect of impairment of cognitive functions and, more particularly, to a system and method configured to simulate the effects of the recreational use of marijuana and/or consumption of a second drug amplifying the impairment effect.

SUMMARY

Embodiments of the invention provide a system for simulating cognitive impairment of a user. Such system includes a pair of goggles containing a first optical filter element (with first and second spatial dimensions and an optical filtering function with a spectral pass-band around a first wavelength representing a first color) and a second optical filter (with the first and second spatial dimensions and the optical filtering function). The pair of goggles has a first axis connecting centers of the first and second optical filter elements and a second axis that is substantially perpendicular to the first axis, while at least one of the first and second optical filter elements includes a pattern in a body of such optical filter element. The pattern defines different phase delays for first and second collimated light beams that are incident on such optical filter element substantially normally to a plane defined by the first and second axes, and extends substantially straight along a third axis in the plane (the third axis is inclined with respect to the first axis). The system also includes a first radiant object configured to reflect light at a second wavelength defining a second color (here, the first and second optical filter elements are configured to substantially block light at the second wavelength) and a second radiant object configured to reflect light at a third wavelength within the spectral pass-band (here, the third wavelength defines a third color that is complementary to the second color). The system additionally includes a substrate bearing a graphic representation of a system of at least partially intersecting roads in a form of a substantially irregular pattern of multiple differently colored paths. At least a first portion of the graphic representation is configured to reflect light at a first set of wavelengths, where wavelengths from the first set of wavelengths define corresponding colors that are complementary to at least the second color. At least a second portion of the graphic representation is configured to reflect light at a second set of wavelengths, where wavelengths from the second set of wavelengths define corresponding colors that are complementary to at least a color that is complementary to a color defined by a wavelength outside the spectral pass-band. In a specific case, a period of the pattern in a body of an optical filter element is defined so as to not produce an optical diffraction effect at the pattern when the pattern is irradiated with visible light. (In at least one case the pattern in the body of at least one of the first and second optical filter elements is defined by a relief structure on a surface of such optical filter element.) In at least one case, the first and second optical filter elements are configured as lenses of the goggles.

Embodiments further provide a system for simulating cognitive impairment of a user, with such system including a first optical filter element having a first axis and a second axis defined in a surface of the first optical filter element (the first and second axes being substantially perpendicular to one another) and having an optical filtering function defined by (i) a spectral pass-band around a first wavelength (the first wavelength defining a first color) and (ii) a spatial pattern at a body of the first optical filter element (the pattern defining different phase delays for first and second collimated light beams that are incident substantially normally at the first optical filter element and propagate through the first optical filter element). The pattern extends substantially straight along a third axis in the surface of the first optical filter element (the third axis bisecting an angle formed between the first and second axes). The optical filtering function is present at every point across the first and second dimensions of the first optical filter element and is spatially-invariable within bounds of the first optical filter element.

BRIEF DESCRIPTION OF THE DRAWINGS

The invention will be more fully understood by referring to the following Detailed Description in conjunction with the generally not-to scale Drawings, of which.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with the idea of the present invention, method and apparatus are disclosed for simulating effects of impairment of perception and response caused by consumption of the cannabis plant alone or in combination with a secondary common drug (such as alcohol, for example (and, in particular, the effects of distorted perception of visual information, loss of motor coordination, and loss of reaction time to familiarize the user with the potential consequences of the consumption of cannabis alone or in combination with the effect-amplifying secondary drug).

Cannabis is known to produce psychoactive and physiological effects when consumed. Aside from the most common short-term physical and neurological effects (among which there are increased heart rate, increased appetite and consumption of food, lowered blood pressure) and the immediate effects desired by a consumer (such as relaxation, mild euphoria, subjective changes in mood, the "high" or "stoned" feeling), the immediate undesired side-effects include alteration of visual perception, impairment of short-term and working memory, psychomotor coordination and concentration, decrease in short-term memory, dry mouth, impaired motor skills and reddening of the eyes.

Recreational use of marijuana/THC (dried flowers and subtending leaves and stems of the female Cannabis plant) has been shown to impair cognitive functions on a number of levels—from basic motor coordination to more complex executive function tasks, such as the ability to plan, organize, solve problems, make decisions, remember, and control emotions and behavior. The effect produced by using an embodiment of the invention is to give the user an experience of cognitive impairment associated with the recreational marijuana use and demonstrate the susceptibility of the user to this impairment and the degree of potential consequences that may occur, in one instance—the cognitive effects on motor skills.

While THC use affects perception, short-term memory, problem-solving skills, and reaction time, alcohol affects gross motor coordination, judgment, concentration, visual acuity, and reaction time. The combination results in increase of impairment of coordination and increased distortion of the brain's ability to process cognitive information. These impairments negatively impact an individual's driving skills and ability to react appropriately to object and hazards while driving. Some notable impacts from the combination may be: THC inhibits the body's need to vomit. The body's reflex to vomit toxins can save a person's life in a binge-drinking/alcohol poisoning situation. However, when a person also consumes THC, it can inhibit the body's protective response of expelling excess toxins.

A problem of practical simulation of cognitive impairment caused by the use of marijuana and/or a secondary common drug taken simultaneously is solved by exposing a user to perceiving the ambient environment through an optical filter system configured to distort the vision of the user within the field of view (FOV) such as to i) deviate a line of sight of the user in comparison with the default line of sight existing in absence of the optical filter system and/or ii) removing at least one color, as perceived by the user looking at the ambient environment through the optical filter system, from the color gamut that characterizes the ambient. The optical filter system is judiciously structured such as to avoid a pre-conceived notion, of a user looking at the optical filter system, that the use of the system is going to affect the visual perception of the ambient. For example, the optical filter system is configured to be transparent, with minimal scattering of light, to allow imaging of objects in light passing therethrough. A set of actions, performed by the user perceiving the ambient through the optical filter system, is designed to compare the results of such actions with results that would be achieved in absence of the optical filter system and analyze the effects of impairment simulation.

According to the idea of the invention, an implementation of a system for simulating cognitive impairment by affecting a vision of a user includes an optical filter system having a spatially two-dimensional optical filtering function. The system also includes at least one radiant object that has a corresponding spectral characteristic and is configured to deliver light at a respectively corresponding wavelength, whether by emitting such light (and being a source of light itself) or by reflecting light incident onto the radiant object from the ambient environment. In the latter case, the radiant object is passive and delivered reflected light within a spectral band defined by the spectral band of the light incident onto the object and the reflectance characteristics of the object. In practice, the operation of the system includes performing various actions involving the radiant object while looking at the ambient and/or the radiant object through the optical filter system. The optical filtering function of an embodiment of the optical filter system may additionally include a pattern (formatted as a surface relief pattern or as a pattern of the refractive index distributed through the body of an optical filter of the optical filter system) defined such as to locally deviate a beam of light propagating through the optical filter from a direction of its initial propagation, and thereby incline such beam upon its transmission through the optical filter—in either one plane or two planes that are transverse to one another. In a specific case, the pattern is dimensioned to not produce an optical diffraction effect at the pattern when the incident light is visible light.

Optical system and auxiliary tools.

Embodiments of the system of the invention include an optical system and several auxiliary tools such as, for example, radiant objects.

Figure 1:
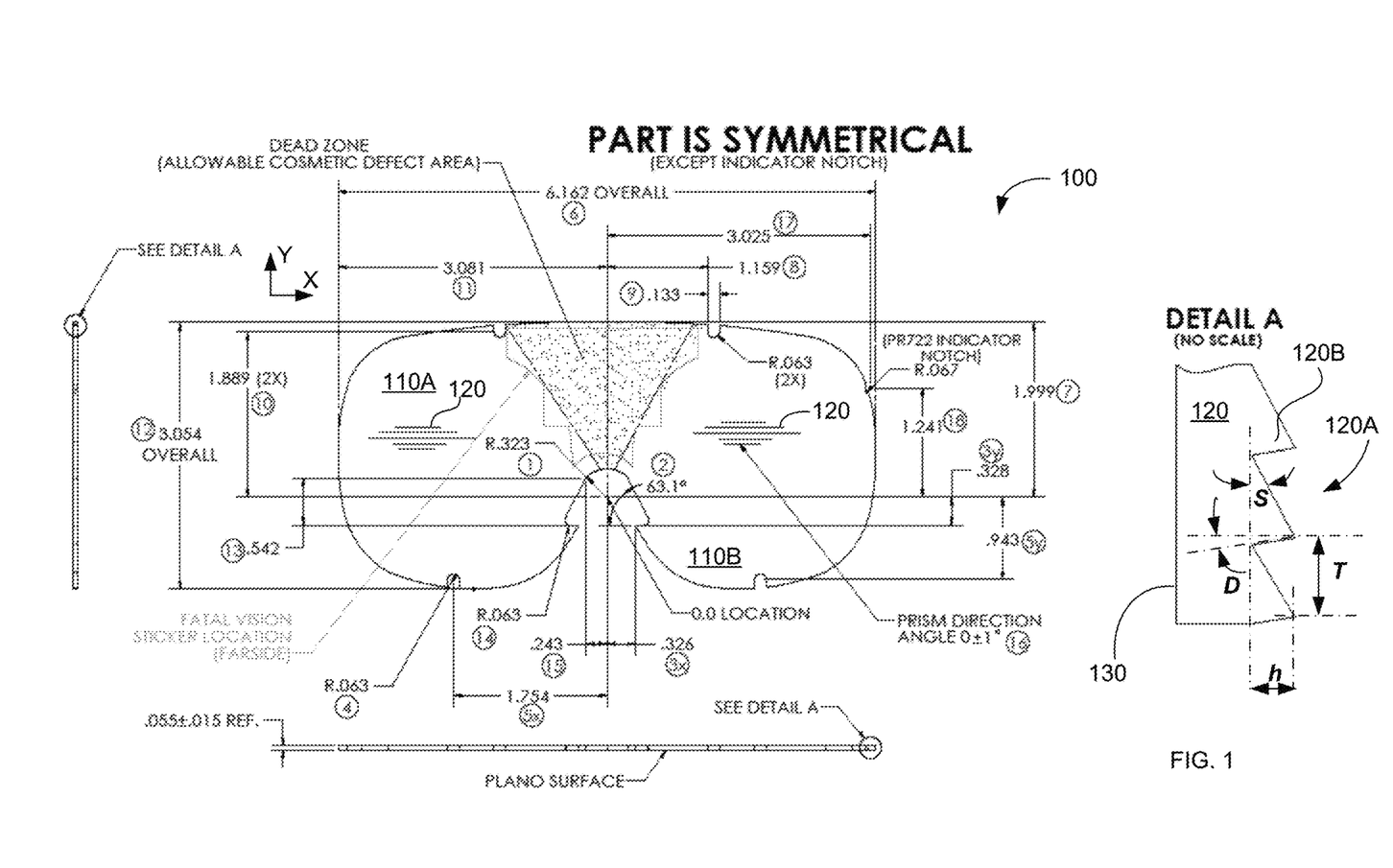
FIG. 1 is a schematic illustration of an optical system according to an embodiment of the invention.

FIG. 1 illustrates an implementation 100 of the optical filter system of the present invention, which is shown formatted as goggles in which each of the lenses 110A, 110B includes a spectral optical filter having a pass-band characterized by a central wavelength. This embodiment may be used to simulate the effects of cognitive impairment cause by the consumption of cannabis, as discussed below. The spectral characteristic of the lenses 110A, 110B is substantially the same across the lenses within their bounds. The lenses can be made of glass or a flexible plastic sheet. In the latter example, the typical thickness of the lenses is about 0.05 inches. Due to the parameters of the spectral transmission, the lenses are perceived by the user as optically transparent elements the color of which is substantially the same at any point within the bounds of the lenses. It is notable that, according to the idea of the invention, both the spectral pass-band of a spectral filter of the embodiment and the central wavelength of such pass-band are judiciously defined in operational correspondence with the spectral characteristics of at least one of the two radiant objects of the embodiment, as discussed below.

Figure 10:
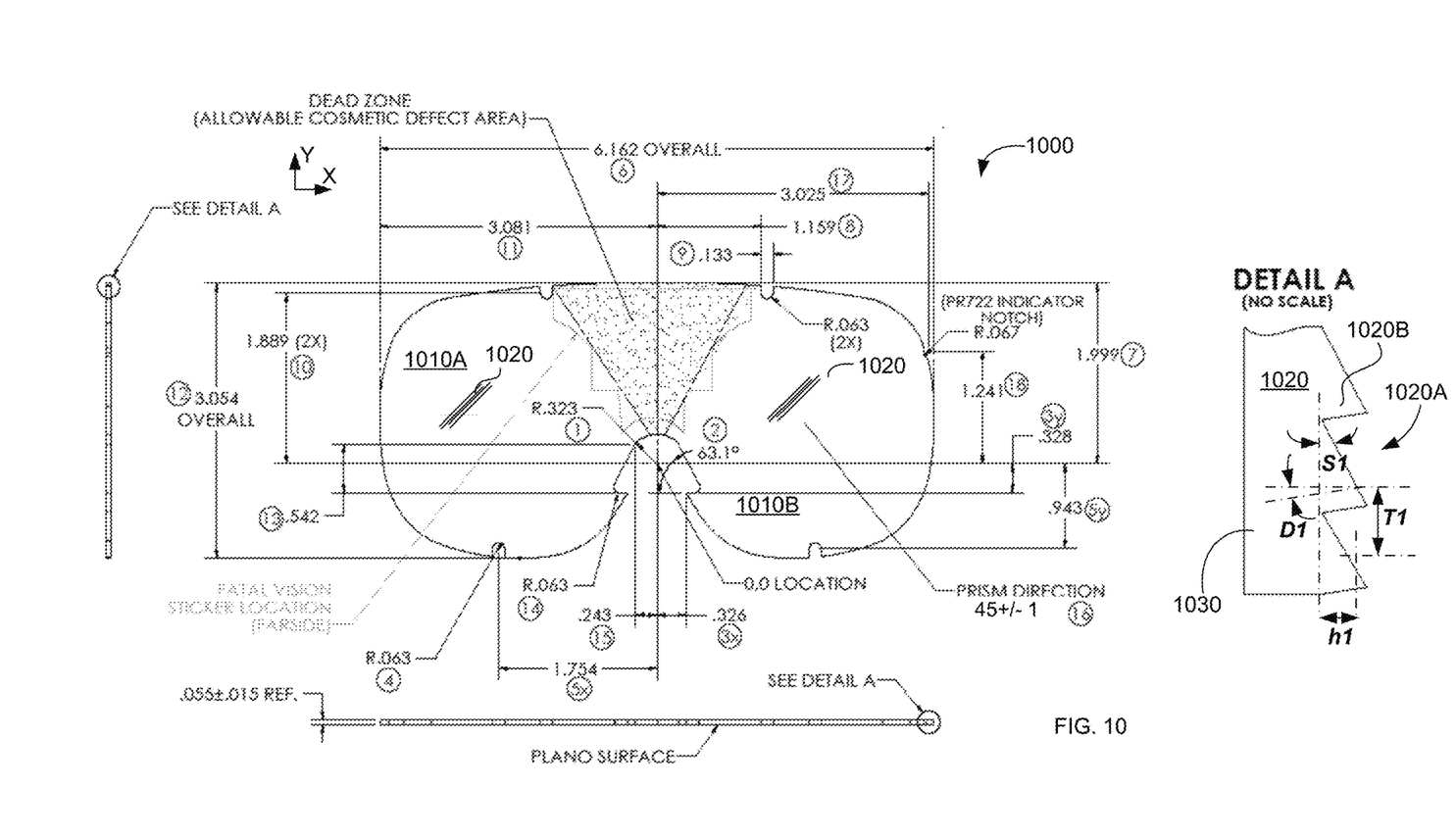
FIG. 10 provides a schematic illustration of a related embodiment of the system of the invention configured for use to simulate the amplified cognitive impairment effect caused by consumption of a combination of drugs.

FIG. 10 presents an illustration of a related embodiment 1000 of the optical filter system that is configured to simulate an amplified effect of cognitive impairment that is stronger than that caused by the consumption of cannabis alone: with this embodiment, the effect of consumption of cannabis in combination with a secondary drug (such as alcohol, for example) is feigned, as discussed in more detail below. Here, just as in the case of the embodiment 100, the embodiment 1000 is formatted as goggles in which each of the lenses 1110A, 1110B includes a spectral optical filter having a corresponding pass-band characterized by a chosen central wavelength. The spectral characteristic of the lenses 1110A, 1110B is substantially the same across the lenses within their bounds. The lenses can be made of glass or a flexible plastic sheet. In the latter example, the typical thickness of the lenses is about 0.05 inches. Due to the parameters of the spectral transmission, the lenses are perceived by the user as optically transparent elements the color of which is substantially the same at any point within the bounds of the lenses. It is notable that, according to the idea of the invention, both the spectral pass-band of a spectral filter of the embodiment and the chosen central wavelength of such pass-band are judiciously defined in operational correspondence with the spectral characteristics of at least one of the two radiant objects of the embodiment, as discussed below.

Coordination of Spectral Characteristics of Optical System and Auxiliary Tools.

Figure 5:
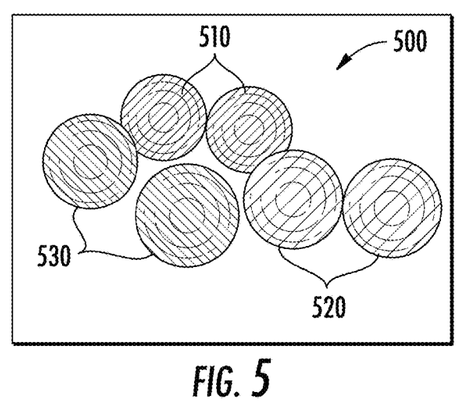
FIGS. 5, 6, 7, 8, and 9 show various radiant objects and auxiliary tools.
Figure 6:
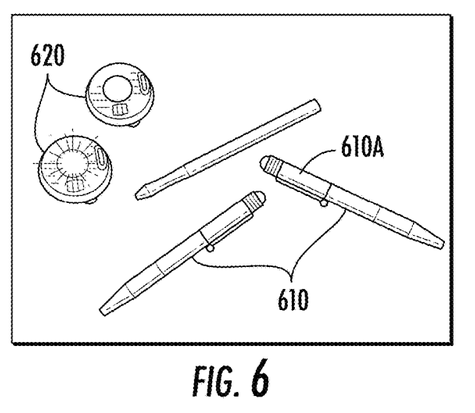

FIGS. 5, 6, 7, and 12, for example, illustrate embodiments of various radiant objects according to the idea of the invention. The term radiant as used in this disclosure refers to either the active quality of emitting rays of light or a passive characteristic of being bright and/or shiny. As shown in FIG. 5, for example, the radiant object includes balls 500 (or, alternatively, radiant elements shaped differently) that are colored (by pigmentation, for example) in strict correlation with the spectral pass-band of the optical filter(s) of the invention. Specifically, the coloration of at least one of the elements 500 is chosen within the spectral band chosen such as to define, in reflection of ambient light incident onto the radiant element, a color that is complementary to the color defined by the spectral pass-band of the optical filter of the invention. Complementary (or opposite) colors as used in this disclosure are pairs of colors which, when combined, cancel each other out. This means that when a given radiant object that is colored in a fashion complementary to the spectral characteristic of the optical filter of the invention is viewed through such filter, the radiant object is perceived as black. As shown in FIG. 5, the balls include two black balls 510, two red balls 520, and two orange balls 530.

The units having complimentary colors, when placed next to each other, create the strongest contrast for those particular two colors. In one non-limiting example, the embodiment of the system of the invention includes optical filters providing high level of transmission in the green portion of the spectrum and blocking light in the red portion of the spectrum, while at least one radiant object is colored red. Other pairs of complementary colored can be used such as yellow and violet, or blue and orange, for example.

Figure 11:
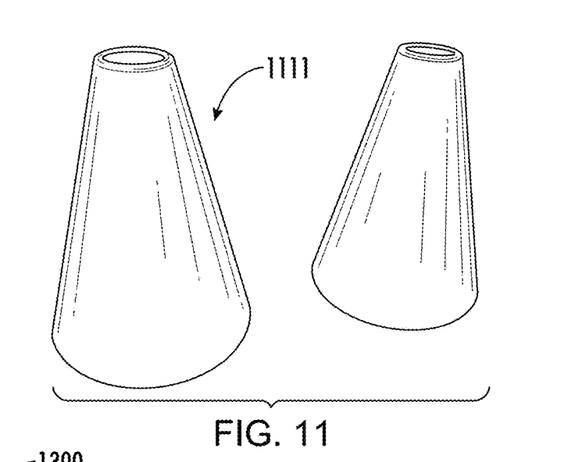
FIGS. 11, 12, and 13 illustrate various additional radiant objects and auxiliary tools for use with the embodiment of FIG. 10.

FIG. 11 illustrates black supporting cones 1111 used in at least one of exercises discussed below that are used for practical simulation of the condition of cognitive impairment.

Figures 12, 13:
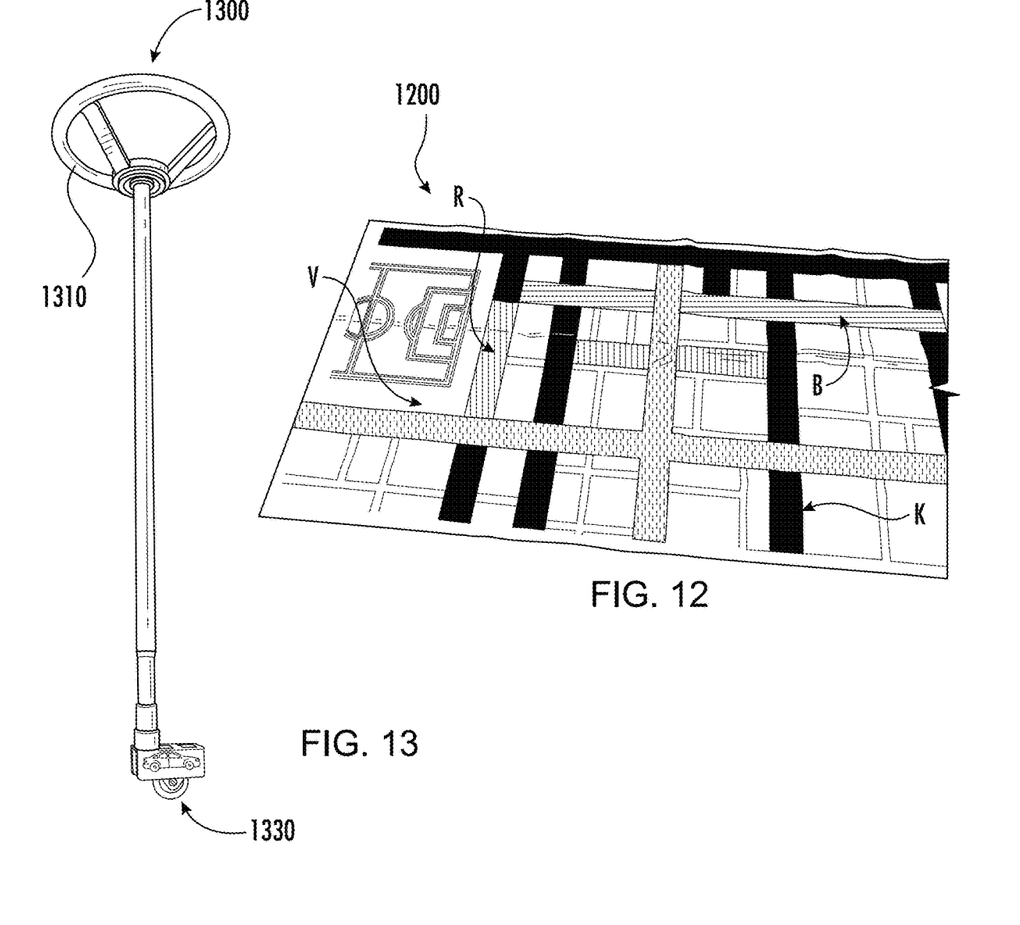

In a related case, depicted in FIG. 12 that shows a mat carrying a pattern of stripes of different colors (R, red; B, blue; V, violet; K, black in this example) representing a network of roads various portions of which have different traffic-related characteristics that can be recognized only when the difference in respective colors is registered and/or recognized by the user.

In a related embodiment, the radiant object may include a source generating light within the spectral band that is complementary to the spectral band of the optical filter(s) of FIG. 1 and/or FIG. 10. For instance, in reference to FIGS. 6 and 7, the sources of light can be configured to generate light continuously or in a modulated (flashing) fashion. For example, sources of light may include a pen 610 containing an LED 610 that is wired to operate in a flashing regime or in a continuous regime, at user's discretion; a laser pointer 710 including one or more laser diodes at least one of which generates light within the band complimentary to the pass-band of the optical filter 110A, 110B; or just a simple light source 620 (an LED, for example) configured to operate either continuously or flashing. The source of light can be part of a digitally projected video image, wherein certain pixels or portions of the image can radiate light within the appropriate complementary spectral band.

Figure 2A:
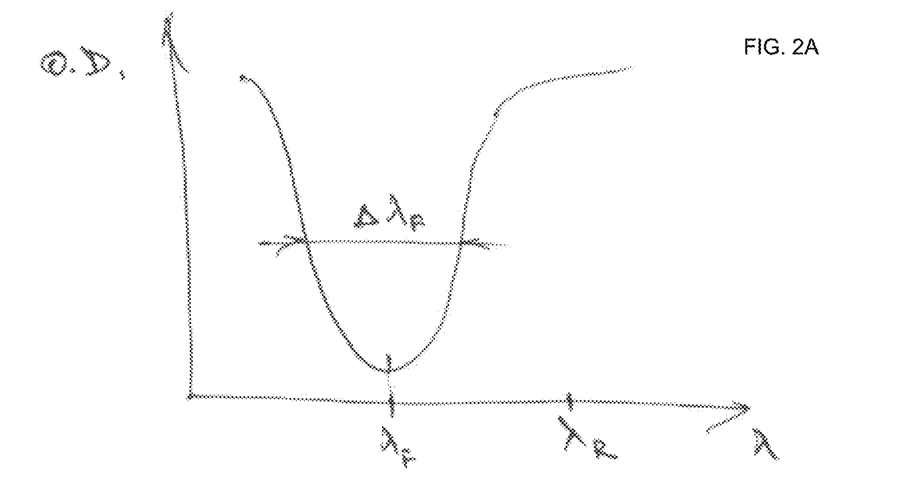
FIG. 2A is a schematic plot providing illustration to a choice of the spectral characteristic of an optical filter in reference to that of a radiant object of an embodiment.
Figure 2B:
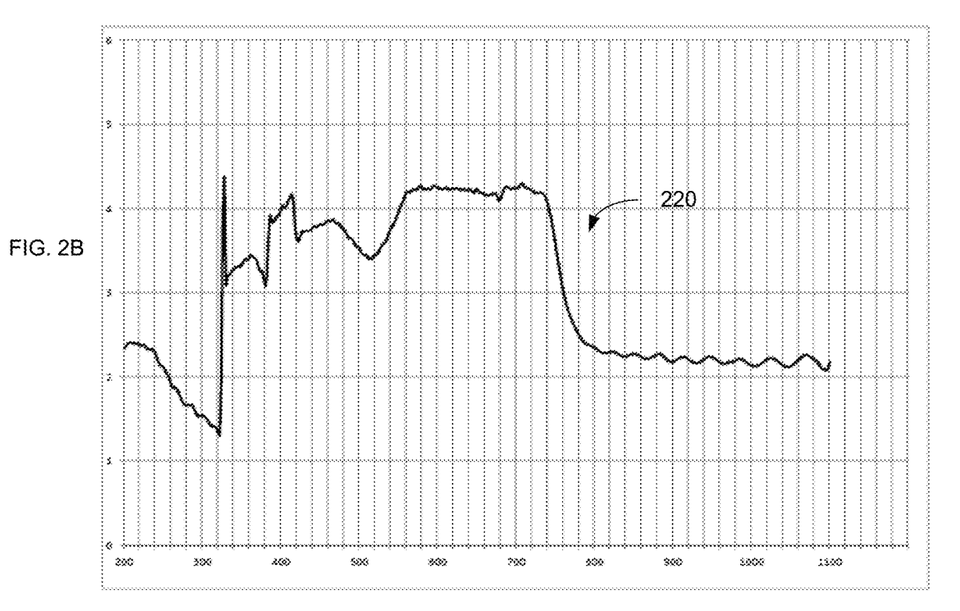
FIG. 2B is a plot showing an empirically-measured spectral characteristic of an embodiment of the optical filter.
Figure 2C:
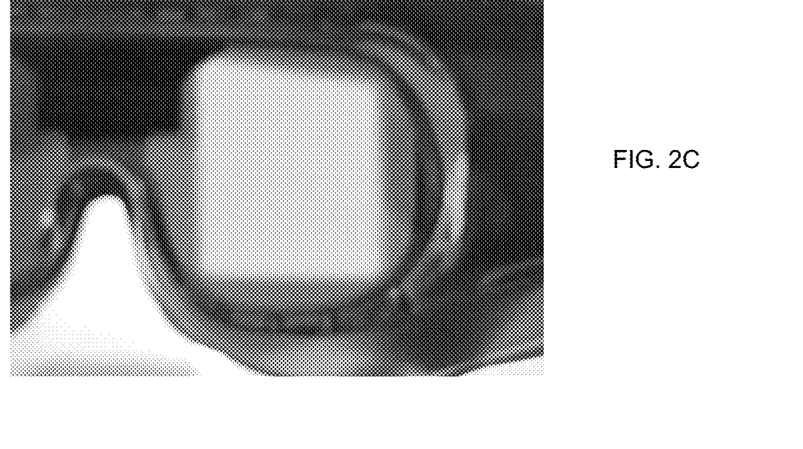
FIG. 2C provides an image of a white field obtained through an optical filter of the invention to illustrate the spectral effect produced by the optical filter.

An example of one operationally sufficient spectral characteristic 200 of the optical filter(s) of the invention is schematically presented in FIG. 2A with indication of relative coordination of the parameters ($\lambda_F$, $\Delta\lambda_F$), which define the absorption of optical filters 110A, 110B, and the wavelength $\lambda_R$ that is associated with the color of a radiant object. The color defined by the pass-band $\Delta\lambda_F$ and/or the wavelength $\lambda_F$ is complementary to that associated with $\lambda_R$. It is appreciated that in practice, when an optical filter of the invention exhibits sufficiently large (for example, severalfold) difference between the transmission of light at complementary wavelengths, the operational goal of using such optical filters in an embodiment of the invention will be achieved. A measured spectral characteristic 220 of the optical filters 110A, 110B is shown in FIG. 2B. While not necessarily optimized, the spectral curve 220 illustrates that the level of transmission in the green portion of the visible spectrum is on the order of magnitude (or at least several times) smaller than that in the red portion of the visible spectrum. In practice, such optical filter(s) sufficiently block transmission of red light from the radiant objects. FIG. 2C illustrates an image of white field viewed as green in transmission through an embodiment of the optical filter.

Spatial Characteristics of Optical Filter(s).

In addition to pre-determined spectral pass-band of the filters 110A, 110B of FIG. 1 and filters 1010A, 1010B of FIG. 19, each of the filters contains an additional spatial pattern at a body of such optical filter. The spatial pattern is judiciously configured to define different phase delays for two different light beams that propagate through the optical filter at different points.

Referring again to FIG. 1, for example, a non-limiting example of such pattern is shown in inset as a prismatic surface-relief structure 120 defined at the surface of each of the filters 110A, 110B by rulings 120A (which may be spatially periodic or non-periodic, depending on the details of particular implementation). As shown, the prismatic structure is periodic and includes linear rulings/grooves separated by the prismatic elements 120B that extend, substantially, across the whole clear aperture of the filters 110A, 110B. While the direction in which the prismatic structures 120B (and the rulings 120A) are extended preferably substantially coincides with a horizontal direction as defined by the use of the goggles 100 (and shown as the x-axis in FIG. 1), it is appreciated that a related embodiment with certain angular deviation between the direction of the rulings 120A and the x-axis, possible in practice, is still within the scope of the invention. An example of such deviation is indicated in FIG. 1 as +/−1 degree, but in practice can be several degrees, for example +/−5 degrees or even within the range of +/−10 degrees.

Figure 3:
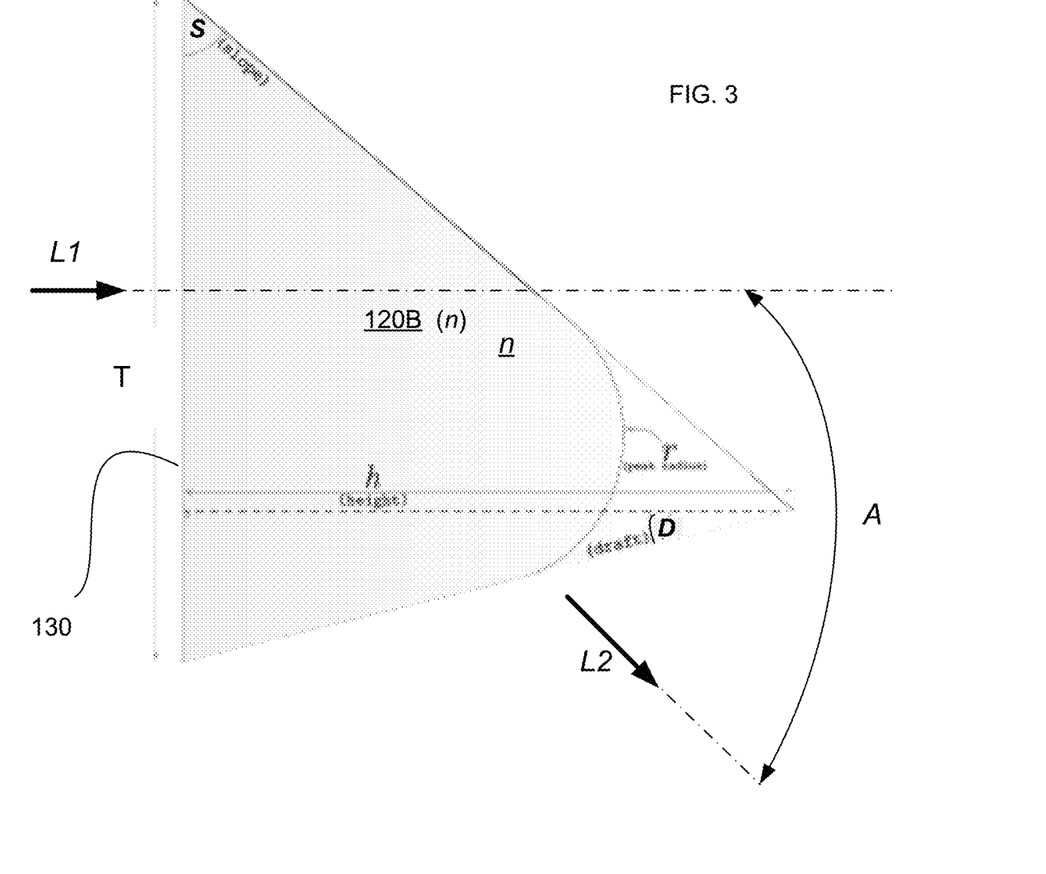
FIG. 3 is a diagram illustrating a prismatic element of a surface-relief pattern of an optical filter according to an embodiment.

The spatial pattern 120 of the optical filters 110A, 110B in the specific example of FIG. 1 is defined by the period T, the slope angle S (an angle between a facet of an element of the prismatic structure with respect to the planar surface 130 of the optical filter 110A, 110B), the draft angle D, and the height h. FIG. 3 provides a schematic illustration of a single prismatic element 120B of the prismatic structure 120, which has a refractive index n. In one example, the period T is about 150 microns, the slope angle S is about 19°, and the draft angle D is minimized (the residual draft angle may be about a couple of degrees or so, which is defined by the process of manufacture of the prismatic structure 120). A person of ordinary skill in the art will appreciate that the degree of uncertainty in specifying these values denoted is determined, on the one hand, at least by the practical limitation of equipment used to fabricate the spatial pattern and, on the other hand, by a need to satisfy the "stealthy" appearance of the pattern to the naked eye of the user. For example, it may be preferred that the period T of the pattern is chosen such as to not produce any visually perceivable optical effects (such as the optical diffraction effect) when viewed by the user. At the same time, the period T should be such as to be not easily discernible. Accordingly, in one embodiment the value of T could exceed the wavelength of visible light while being smaller than, for example, a millimeter.

Figure 4A:
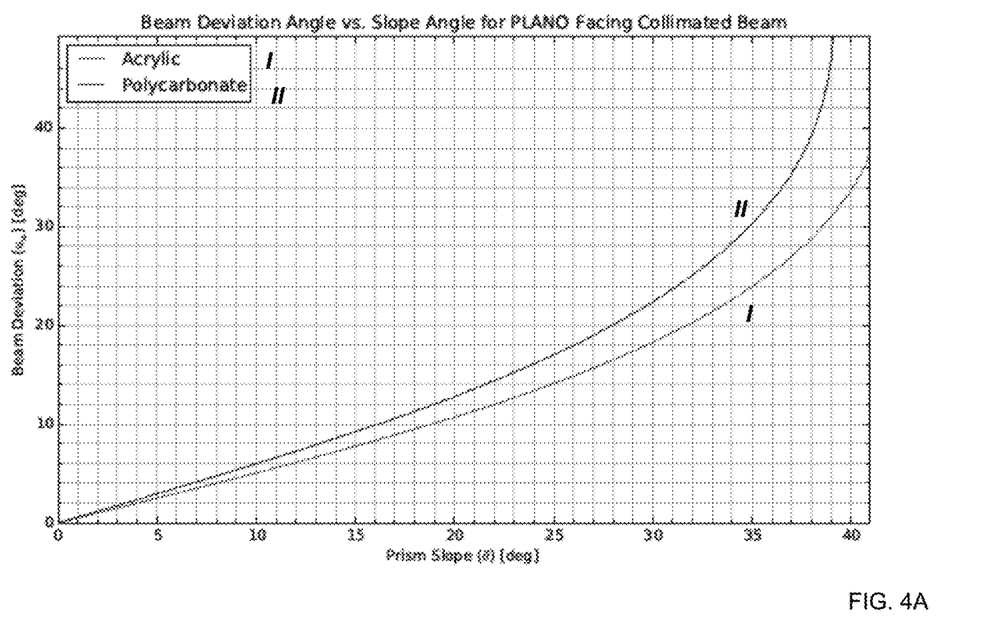
FIGS. 4A and 4B provide plots illustrating theoretical dependence of angle of deviation of the beam of light incident onto the optical filter configured according to the embodiment of FIG. 1, for different orientations of the optical filter with respect to such beam of light.

In reference to FIG. 3, for a collimated beam of light L1 incident normally onto a plano-prismatic optic such as the element 120B, the angle of deviation A of the throughput light beam L2 from the direction of incidence may be calculated as a function of the slope angle S. The dependence of angle A on the slope angle differs depending on whether the collimated beam impinges from the ambient on the planar surface 130 of the optical filter 110A (as shown in FIG. 3) or on the surface of the prismatic structure (in other words, on the orientation of the optical filter with respect to incident light). In the case of FIG. 3, in which the planar side 130 of the optical filter 110A, 110B faces in input light L1, the value of the angle of deviation A is defined as $$A = \arcsin\left\{\frac{q}{q^2+1}\left[-n + \sqrt{1-(n^2-1)q}\,\right]\right\}, \quad (1)$$

where q=tan(S). FIG. 4A illustrates this dependence of the angle A on the angle S for two materials (acrylic, I; and polycarbonate, II). In the case in which light L1 from the ambient is incident onto the prismatic surface of the optical filter 110 (which, in the coordinates of FIG. 1 corresponds to the surface relief structure 120 being disposed at the surface of the lenses facing the user, in operation), the deviation angle can be shown to follow $$A = \arcsin\left\{\left[\frac{-q}{q^2+1} + \sqrt{\frac{q^2}{q^2+1} + \left(\frac{1}{q^2+1}n^2 - 1\right)}\,\right]\right\}. \quad (2)$$

Figure 4B:
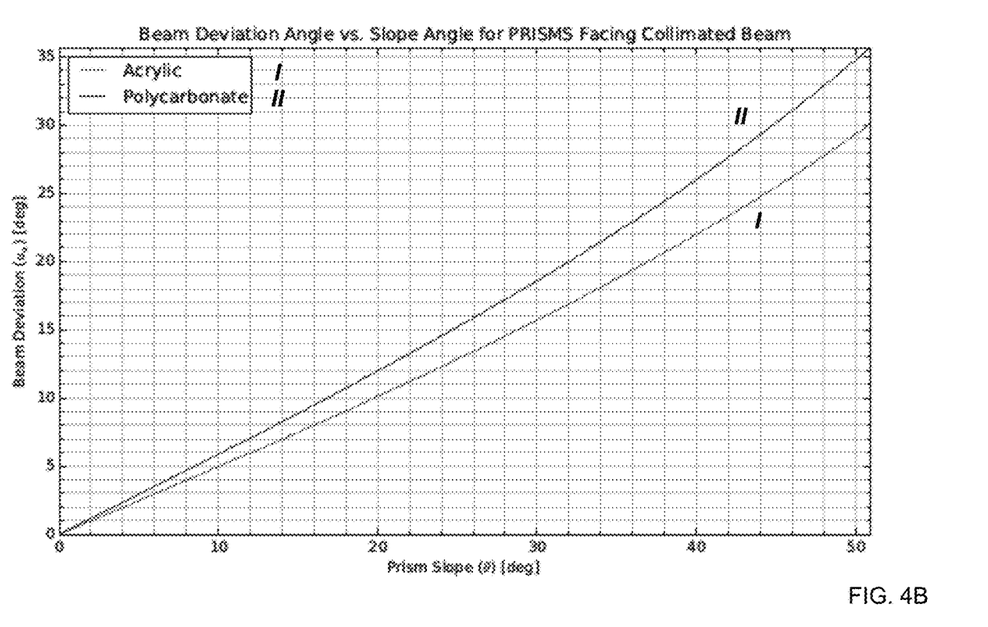

FIG. 4B illustrates this dependence of the angle A on the angle S for two materials (acrylic, I; and polycarbonate, II).

As follows from FIGS. 1 and 3, the prismatic structure 120 is configured to cause the user wearing the optical filter(s) 110A, 110B in front of his eyes to change his line of sight and look upwardly (into the beam L2) when perceiving the ambient environment through the optical filters, which correlates with behavior of a person under the influence of recreational marijuana and/or correlates with a slight sensation of impairment of such person. Depending on the desired strength of this effect (i.e., depending on the desired angle of deviation A), the slope angle S may be changed within the appropriate limits the examples of which are illustrated in FIGS. 4A, 4B.

It is appreciated that, in a related embodiment, the pattern 120 can be formed in the body of the optical filters as a phase-based element (for example, by structuring the bodies of the optical filters to contain an array of linear bands or areas the refractive index of which differs from that of the surrounding portion(s) of the filters 110A, 110B).

Referring now to the embodiment of FIG. 10, a pattern 1020 that is analogous to the pattern 120 is oriented at an angle substantially equal to 45 degrees with respect to the horizontal direction (denoted by the local x-axis in FIG. 10). It is appreciated, however, that a related embodiment with certain angular deviation between the direction of the pattern and the x-axis, possible in practice, is still within the scope of the invention. An example of such deviation is indicated in FIG. 10 as +/−1 degree, but in practice can be several degrees, for example +/−5 degrees or even within the range of +/−10 degrees. The inset to FIG. 10 illustrates this pattern to be configured as a prismatic surface-relief structure 1020 defined at the surface of each of the filters 1010A, 1010B by rulings 1020A (which may be spatially periodic or non-periodic, depending on the details of particular implementation). As shown in this example, the prismatic structure 1020 is periodic and includes linear rulings/grooves separated by the prismatic elements 1020B that extend, substantially, across the whole clear aperture of the filters 1010A, 1010B The spatial pattern 1020 of the optical filters 1010A, 1010B in the specific example of FIG. 10 is defined by the period T1, the slope angle S1 (an angle between a facet of an element of the prismatic structure with respect to the planar surface 1030 of the optical filter 1010A, 1010B), the draft angle D1, and the height h1. A schematic illustration of FIG. 3 is substantially applicable to assessment of a single prismatic element 1020B of the prismatic structure 1020, which has a refractive index n of impact-resistance acrylic material. In one example, the period T1 is about 150 microns, the slope angle S1 is about 31°, and the draft angle D1 is about 3 degrees (and is generally minimized as defined by the process of manufacture of the prismatic structure 1020), and the height h1 is about 88.5 microns. A person of ordinary skill in the art will appreciate that the degree of uncertainty in specifying these values denoted is determined, on the one hand, at least by the practical limitation of equipment used to fabricate the spatial pattern and, on the other hand, by a need to satisfy the "stealthy" appearance of the pattern to the naked eye of the user. For example, it may be preferred that the period T1 of the pattern is chosen such as to not produce any visually perceivable optical effects (such as the optical diffraction effect) when viewed by the user. At the same time, the period T1 should be such as to be not easily discernible. Accordingly, in one embodiment the value of T1 could exceed the wavelength of visible light while being smaller than, for example, a millimeter. As a person of skill in the art will readily appreciate, however—and in reference to the schematic of FIG. 3—the deviation of the light beam L1 upon transmission of the structure 1020A, 1020B is different from that illustrated in FIG. 3. Indeed, the inclination of the pattern 1020A, 1020B with respect to both axes x- and y-of the local coordinate system of FIG. 10 indicates that such deviation will occur in both the xz-plane and the yz-plane. As a result, the visually-perceived modification of the object space viewed by the user through the filter 1010A, 1010B is substantially more significant than that achieved with the use of a filter 110A, 110B. This facilitates the amplification of the effect of cognitive impairment achieved with the use of the embodiment of the optical system of FIG. 10 as compared with the use of the embodiment of the optical system of FIG. 1.

In contradistinction with optical filters of related art (which feature translucent filters), the embodiments of the present invention include filters that are optically-transparent and have a spectral characteristic (such as a pass-band, for example) that is invariable as a function of the position across the filter. Optical transparency is known to be the physical property of allowing light to pass through the material without being scattered. On a macroscopic scale (one where the dimensions investigated are much larger than the wavelength of light in question), Snell's law is followed. To the contrary, the property of translucency allows light to pass through without following (again, on the macroscopic scale) Snell's law; the photons can be scattered at either of the two interfaces where there is a change in index of refraction, or internally. In other words, a translucent medium allows the transport of light while a transparent medium not only allows the transport of light but allows for image formation. As discussed above, embodiments of the present invention also contain a physical pattern (such as a surface prismatic structures 120, 1020 or their phase-structure analog formed by the variation of the refraction index) that is a linear function of a spatial coordinate along a surface of the filter, judiciously configured to ensure that light incident onto the optical filter from the ambient is deviated from its original direction of propagation and re-directed in the same new direction regardless of a point of incidence of the ambient light onto the filter. Such physical pattern is extended along a straight line.

Additional System Components.

Figure 7:
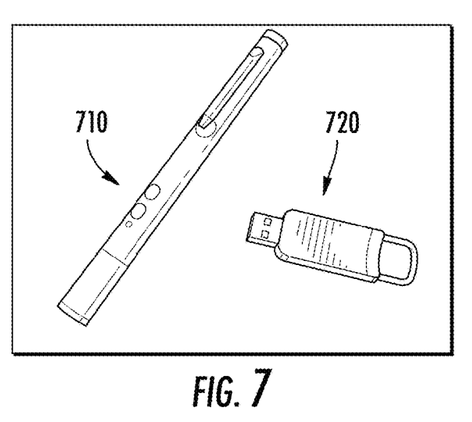

An embodiment of the invention may additionally include a maze 800 drawn on a pad (FIG. 8), different portions of which may have complementary colors associated with the spectral characteristics of the optical filters and used for simulating of impairment of executive function; a video (for example, on a tangible non-transitory storage medium such as a flash-drive 720, FIG. 7) containing various driving scenes used for illustration of the road condition to the user and simulation of the impairment of the reaction time, visual perception, and response; and/or a grid-mat 900 (FIG. 9) with a road pattern on it that is used, in conjunction with a least one of the radiant objects 910, for simulation of the impairment of the effect of marijuana on the short-term memory of the user. Alternatively, the maze 800 can be provided on a surface that permits reuse after cleaning. The maze can be permanently or semi-permanently provided on the surface. For example, the maze 800 can be printed onto a reusable whiteboard surface, which can itself be portable or fixed, such as to a wall or table.

EMBODIMENTS OF THE METHOD

Example 1: The Use of a System for Simulating a Distorted Perception of Visual Information and Missing Important Visual Clues According to an embodiment of the method of the invention, the user is caused to catch, one at a time, several radiant objects 500 each of which is shielded from his view until tossed to the user. The chosen radiant objects reflect light of the ambient in different spectral bands, with at least one of the objects being characterized by a color that is complimentary to the color defined by the pass-band of the optical filters of the invention. For example, when the pass-band of the optical filters of the invention is defined in the green portion of the spectrum, some of the radiant objects 500 may be red, some orange, and some black. During the process, the task is defined as catching only the black objects and avoiding the red and the orange ones. The correctness of the choices in determining the color of the objects to be caught made by the user who perceives the environment with a naked eye is compared with the results of a similar experiment when the user is asked to look at the ambient environment through the optical filters 110A, 110B (which may be used in the goggles 100). It is appreciated that the user cannot correctly discern the color of the objects 500 through the optical filters 110A, 110B, as the red balls are perceived through the green filters as being black, and therefore makes more mistakes in trying to catch only the black balls. This test stimulates the cognitive impairment of not recognizing and responding to sensory input that results from recreational marijuana use.

Figure 8:
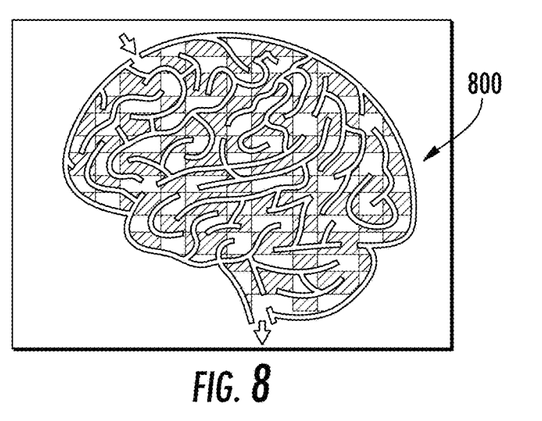

Example 2: The Use of a System for Simulating a Disruption of Executive Functions for Example, Short-Term Memory and Decision-Making Skills This embodiment of the invention illustrates the impact of this impairment on an attempt to solve the maze 800. At the first step, the maze is shown to the user in the video or demonstrated otherwise. The user is then asked to pick a radiant object including a flashing source of light (such as a pen 610 of FIG. 6) and to complete the maze provided on paper, optionally recording the time it takes to complete the maze. Once finished, the user is asked to complete the maze while observing it through the goggles (or just the optical filters) of the invention. The results of these two experiments may be compared and contrasted, during the discussion, to identify confusion, hesitation, and difficulty remembering decisions for completing the maze that have been made prior to wearing the goggles.

Example 3: The Use of a System for Simulating a Loss Attention and Distorted Perception of Visual Information The use of marijuana filters the FOV from which the consumer draws and uses information, especially while driving, while there is nothing physically wrong with the user's ability to see. At the same time, the consumption of marijuana causes the consumer to focus more on only one sensory input at the expense of other sensory inputs. For example, the user concentrates harder of what is seen in front of him and pays less attention to hearing or seeing at the periphery of his FOV.

According to this embodiment of the invention, the object of the test includes a typical driving scenario and items typically seen in a driving situation and is demonstrated to the user on video. The dual laser pointer (such as the pointer 710 containing the red and green laser sources, for example) is used to point from object to object in the driving scene with the purpose of identifying them verbally. The objects in the driving scene are highlighted with the dual laser pointer randomly and with light beams that are randomly switched from red to green. Following this initialization step, the user is caused to look at the ambient through the optical filters (for example, wear the goggles) configured according to the idea of the invention and has to identify the objects pointed to in the similar fashion. In the latter case, the user does not perceive those objects that are pointed to with a red laser beam when wearing the green optical filters due to the mutual cancellation of the complimentary colors, which demonstrates how being unaware of subtle environment changes can lead to being unprepared for a sudden traffic event.

Example 4: The Use of a System for Simulating a Loss of Reaction Time, Attention, and a Distorted Perception of Visual Information According to an embodiment of the invention, the initialization of this activity is similar to that in Example 3. The driving scenario video is shown to user(s) on the screen. Some of the users are made to look at the ambient environment through the optical filters (for example, wear the goggles 100), while others are observing the scene with a naked eye. Participants wearing the goggles of the invention are asked to use the green laser pointer to point at the brake button on the screen to simulate "hitting the brake" each time they perceive that the traffic conditions require braking or covering the brake. Participants not wearing the goggles are asked to use red laser pointers to point at the brake button each time they perceive that the traffic conditions require braking or covering the brake. The red laser spots on the screen will not be seen by the participant(s) wearing the goggles. The results of both tests and, in particular, the difference in reaction time required for the two groups of participant to react to changes in the traffic conditions are then analyzed to identify missed, delayed, or incorrect braking in the traffic conditions done by a given participant.

Figure 9:
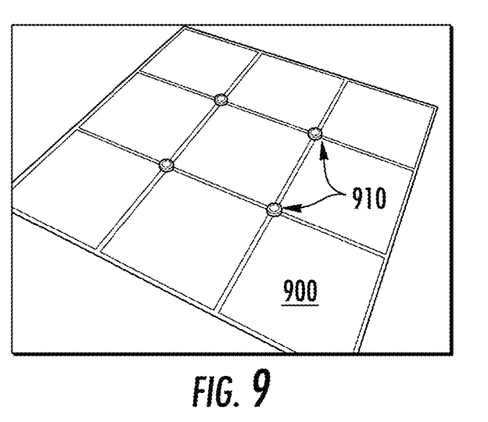

Example 5: The Use of a System for Simulating Impairment of Motor Skills, Memory, and Decision Making Abilities According to an embodiment, the grid mat having a square pattern on it is laid out on the floor, and sources of light 620, 910 some of which are configured to generate light in a flashing/blinking fashion are positioned on the intersections of the square pattern, as schematically shown in FIG. 9. Initially, the user is given time to study the grid with a naked eye and to memorize the intersections with the blinking activity light on. At the next step, the user is asked to put the goggles on and walk the grid identifying, through the optical filters of the invention, which lights are blinking and which are not. The spectrum of light generated by the blinking sources of light corresponds to color that is substantially complementary to the color defined by the spectral pass-band of the optical filters of the invention. Comparison of the results of the identification of the blinking lights on the grid through the optical filers of the invention with those perceived with the naked eye demonstrate the reduced confidence in remembering the lights as being on or off before the user puts the goggles on. The results are discussed with the user to illustrate the impact that short-term memory lapses can have in various situations where the mobility of a person is affected by the use of marijuana (such as driving, walking, biking, for example).

Example 6: The Use of a System for Simulating Loss of Attention and Distorted Perception of Visual Information Caused by Amplified Effect of Consuming More than One Drug This exercise models the amplified danger of combining the use of two substances (such as recreational marijuana and alcohol). This combination results in increase of impairment of coordination and increased distortion of the brain's ability to process cognitive information. These impairments negatively impact an individual's driving skills and ability to react appropriately to object and hazards while driving. This exercise models specific impairments associated with combining alcohol and recreational marijuana/THC and includes distorted perception, poor motor coordination, slowed decision-making, and slowed reaction.

By analogy with Example 3, the substantially simultaneous consumption of marijuana and a secondary common drug (such as alcohol, for example) is simulated with the use of optical filters of the embodiment of FIG. 10. When worn by the consumer, the FOV of these optical filters that is affected by the presence of the pattern 1020A, 1020B, causes the user to perceive visual information distorted to a significant degree, especially when driving, while there is nothing physically wrong with the user's ability to see. At the same time, the consumption of marijuana and alcohol (in this example) causes the consumer to focus more on only one sensory input at the expense of other sensory inputs. For example, the user concentrates harder of what is seen in front of him and pays less attention to hearing or seeing at the periphery of the FOV (that is substantially distorted by the presence of the pattern 1020A, 1020B).

According to this embodiment of the invention, and in reference to FIGS. 12, 13 the object of the test includes a typical driving scenario and items typically seen in a driving situation and is demonstrated to the user with employment of the "driving mat" 1200 carrying the network of differently-colored stripes (representing different roads) and a car-like-contraption 1300 that includes a steering wheel 1310 connected to a roller 1330 through a rod, as shown in the example of FIG. 13.

A set of traffic rules is established as associated with differently-colored "roads" on the driving mat 1200. For example, black-colored paths "K" represent drivable roads; blue path "B" represent drivable roads and opportunities to change lanes; red lane "R" represent restricted roads (such as ones with construction, hazards, or events where roads are blocked off, or private roads) that must not be used; and purple or violet paths "V" represent paths for pedestrians (or bicycles): the used/participant can cross these paths but is not allowed to drive on these paths. The activity objective includes navigation from one side of the mat to the other at a consistent speed without making driving errors by using the wring path or driving off the road.

The user (playing a role of a "driver") is instructed to travel (while keeping the roller rolling along a path on the mat) from one end of the mat to the other, choosing his/her route. The driver starts at any black path, has to drive on the blue and black roads only, and is asked to stop only to make turns or stop momentarily at pedestrian crossings. The driver is instructed to not drive on the red and/or purple paths (but may cross the purple paths). Then, the driver is asked to repeat the same task (possibly starting the activity from the opposite side of the mat) while wearing an embodiment of the optical system (100 or 1000). The observers (spectators) are to identify moments where the participant experienced imbalance and decision-making errors cause by the impediments to his/her vision imparted by the use of the optical filters of the optical system.

Comparison of the results of the identification of the constituent paths/roads on the mat through the optical filers of the embodiment of the invention with those perceived with the naked eye demonstrate the reduced confidence in remembering the lights as being on or off before the user puts the goggles on. The results are discussed with the driver to illustrate the impact that short-term memory lapses can have in various situations where the mobility of a person is affected by the use of marijuana and/or a secondary drug (alcohol, in this case). The exercise take-away message is that, while both alcohol and marijuana alone cause their own impairments, when these two drugs are combined the impairment effects are amplified, thereby increasing the risk for errors and harm to self or others.

Figure 14A:
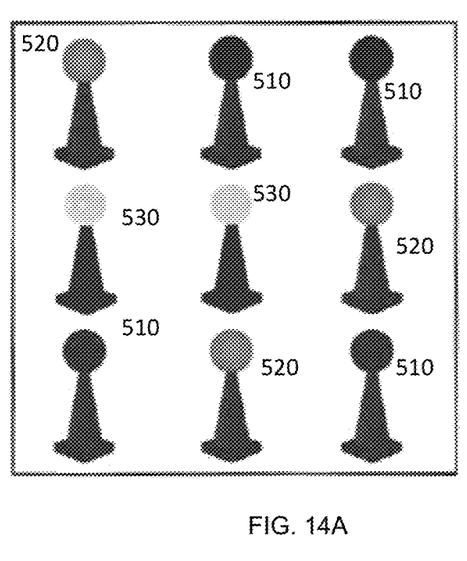
FIGS. 14A, 14B, 14C show examples of spatial configurations of radiant objects for use in one of practical exercises involving the use of the optical system of FIG. 1 or the optical system of FIG. 10.
Figure 14B:
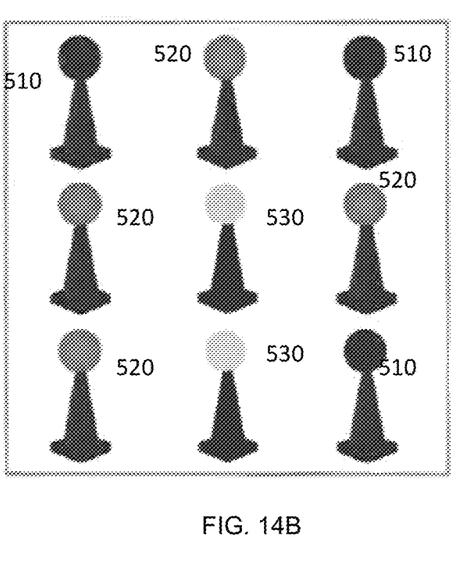
Figure 14C:
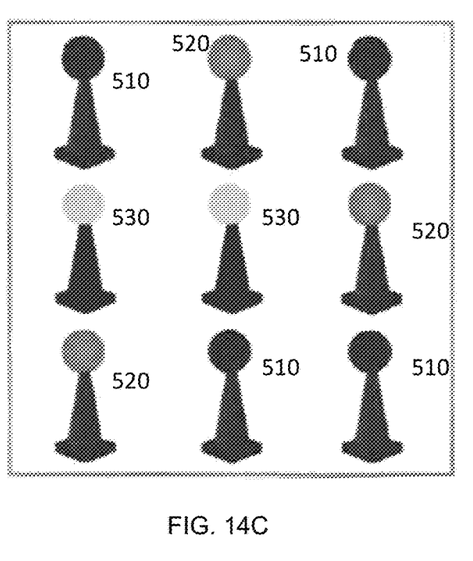

Example 7: The Use of a System for Simulating Increased Impairment of Coordination and Distortion of the Brain's Ability to Process Cognitive Information This exercise can be performed with the use of an embodiment 1000, a piece of walking tape, a plurality of black cones (similar to those of FIG. 11), several black, red, and orange balls 510, 520, 530, and a timer, for example as follows:

The 10-foot long line of a walking tape is placed in front of the table. The cones are set upside-down in a 3×3 pattern on the table. The balls are positioned on the cones in one of three different formations—see formations in FIGS. 14A, 14B, 14C. In the example of FIG. 14B, the are 2 orange balls 530, 4 red balls 530, and 3 black ball 510, while in the formation of FIG. 14A and FIG. 14C there are 4 black balls, 3 red balls, and 2 orange balls. Two attempts are played: without the embodiment of the goggles and while the googles are worn. The goal is to complete one row of three red balls and one row of three black balls by moving, replacing, and switching the balls on the cones. (For example, the participant need to make at least two correct balls placement choice to complete the activity successfully.) This technique ensures that the participant will engage his/her executive function and short-term memory to solve the timed activity, while the googles (FIG. 1 or FIG. 10) impair the executive function and short-term memory.

The results of both tests and, in particular, any loss of balance, confusion, hesitation, errors in judgment, slower decision-making, wanting to give up on the task and the difference in time required to complete the activities in each of the two attempts are then analyzed to identify missed, delayed, or incorrect decisions by a given participant.

In accordance with examples of embodiment, system and method for simulating the impairment caused by consumption of marijuana and/or a secondary drug (such as alcohol) have been described. If the terms "substantially", "approximately", "about" and similar terms are used in reference to a descriptor of a value, element, property or characteristic at hand, then, for the purposes of this disclosure and the appended claims, these terms are is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Modifications to, and variations of, the illustrated embodiments may be made without departing from the inventive concepts disclosed herein. For example, while specific values chosen for an embodiment of the system are recited, in reference to FIGS. 1, 2A, 2B, 3, 4A, 4B, 10 it is to be understood that, within the scope of the invention, the values of all of parameters may vary over wide ranges to suit varying applications. Furthermore, disclosed aspects, or portions of these aspects, may be combined in ways not listed above. Accordingly, the invention should not be viewed as being limited to the disclosed embodiment(s). In addition, the terminology used herein is with the purpose of describing particular embodiments only, and is not intended to limit the scope of the present invention.

The invention claimed is:

1. A system for simulating cognitive impairment of a user, the system comprising:
    a pair of goggles containing:
        a first optical filter element having first and second spatial dimensions and an optical filtering function with a spectral pass-band around a first wavelength representing a first color;
        a second optical filter element having the first and second spatial dimensions and the optical filtering function;
        wherein the pair of goggles has a first axis connecting centers of the first and second optical filter elements and a second axis that is substantially perpendicular to the first axis;
        wherein at least one of said first and second optical filter elements includes a pattern in a body of said at least one of said first and second optical filter elements, the pattern (a) defining different phase delays for first and second collimated light beams that are incident on said at least one of said first and second optical filter elements substantially normally to a plane defined by the first and second axes and (b) extending substantially straight along a third axis in said plane, the third axis being inclined with respect to the first axis,
    a first radiant object configured to reflect light at a second wavelength defining a second color, wherein the first and second optical filter elements are configured to substantially block light at the second wavelength;
    a second radiant object configured to reflect light at a third wavelength within the spectral pass-band, the third wavelength defining a third color that is complementary to the second color;
    and a substrate bearing a graphic representation of a system of at least partially intersecting roads in a form of a substantially irregular pattern of multiple differently colored paths,
  wherein at least a first portion of the graphic representation is configured to reflect light at a first set of wavelengths, wherein wavelengths from the first set of wavelengths define corresponding colors that are complementary to at least the second color; and
  wherein at least a second portion of the graphic representation is configured to reflect light at a second set of wavelengths, wherein wavelengths from the second set of wavelengths define corresponding colors that are complementary to at least an auxiliary color, the auxiliary color being complementary to a color defined by a wavelength outside the spectral passband.

2. A system according to claim 1, wherein
said first light beam is incident onto the at least one of the first and second optical filter elements at a first point,
said second light beam is incident onto the at least one of the first and second optical filter elements at a second point, the first and second points being different from one another.

3. A system according to claim 1, further comprising
a first light-generating source configured to generate light at a fourth wavelength representing a fourth color that is complementary to a color defined by at least one wavelength within the spectral pass-band;
a second light-generating source configured to generate light at a fifth wavelength representing a fifth color that is complementary to a color defined by at least one wavelength outside the spectral pass-band.

4. A system according to claim 3, further comprising
a grid-mat containing a first plurality of first lines and a second plurality of second lines, the first lines being substantially transverse to the second lines to form a set of intersection points at intersections of the first and second lines,
wherein each of said first and second light-generating sources is configured (i) to generate light periodically in a blinking fashion when in an "on" state and (ii) to not generate light when in an "off" state; and
wherein, when said first and second light-generating sources are disposed at respectively corresponding intersection points from the set of intersection points, viewing of said two or more light-generating sources through the pair of goggles causes a reduction of confidence of the user in remembering whether a chosen light-generating source of the first and second light-generating sources was in the "on" state or in the "off" state at the time preceding said viewing.

5. A system according to claim 1, wherein a period of the pattern in a body of an optical filter element is defined so as to not produce an optical diffraction effect at the pattern when the pattern is irradiated with visible light.

6. A system according to claim 1,
wherein said first radiant object includes a first unit colored by pigmentation of said first unit, said pigmentation of the first unit defining the second wavelength of light reflected by the first unit, and
wherein the second radiant object includes a second unit colored by pigmentation of said second unit, said pigmentation of the second unit defining the third wavelength of light reflected by the second unit.

7. A system according to claim 1, wherein said first and second optical filter elements are configured as lenses of said pair of goggles and wherein said pair of goggles are configured to be worn in operation such that each of the first radiant object, the second radiant object, and the graphic representation is separated from an eye by a corresponding lens of said lenses.

8. A system according to claim 1, wherein said pattern in the body of the at least one of the first and second optical filter elements is defined by a relief structure on a surface of the at least one of the first and second optical filter elements.

9. A system according to claim 1, wherein said pattern in the body of the at least one of the first and second optical filter elements is defined by a spatially-periodic prismatic structure.

10. A system according to claim 1, wherein said pattern in the body of the at least one of the first and second optical filter elements is defined by a spatial distribution of a refractive index non-uniformity, and wherein a corresponding optical filter element of the at least one of the first and second optical filter elements has a thickness that is uniform within bounds of said corresponding optical filter element.

11. A system according to claim 1, wherein said first optical filter element is configured to substantially completely absorb light that has been delivered from the first radiant object to the first optical filter element upon transmission of said light through the first optical filter element, said spectral pass-band being the same at every spatial point across the first optical filter element.

12. A system according to claim 1, wherein said first optical filter element is configured to be detachably affixable to a head of the user in proximity of an eye so as to have all light entering the eye from an ambient pass through said first optical filter element.

13. A system for simulating cognitive impairment of a user, the system comprising
  a first optical filter element having
    a first axis and a second axis defined in a surface of the first optical filter element, the first and second axes being substantially perpendicular to one another and
    an optical filtering function defined by
      a spectral pass-band around a first wavelength, the first wavelength defining a first color, wherein said optical filtering function is present at every point across first and second dimensions of said first optical filter element and is spatially-invariable within bounds of the first optical filter element, and
      a spatial pattern at a body of the first optical filter element, the pattern defining different phase delays for first and second collimated light beams that are incident substantially normally at the first optical filter element and propagate through the first optical filter element, the pattern extending substantially straight along a third axis in the surface of the first optical filter element, the third axis bisecting an angle formed between the first and second axes,
  the system configured as googles that simulate the cognitive impairment of the user when worn by the user to observe an environment, said first optical filter element configured as a first lens of said goggles.

14. A system according to claim 13, wherein the system further comprises a second optical filter element having the optical filtering function with the spectral pass-band around the first wavelength, the second optical filter element configured as a second lens of the goggles.

* * * * *